United States Patent

Kouno

[11] Patent Number: 5,138,905
[45] Date of Patent: Aug. 18, 1992

[54] ELECTRONIC-CONTROLLED TRANSMISSION

[75] Inventor: Takao Kouno, Kawasaki, Japan

[73] Assignee: Isuzu Motors, Ltd., Tokyo, Japan

[21] Appl. No.: 751,388

[22] Filed: Aug. 28, 1991

[30] Foreign Application Priority Data

Aug. 31, 1990 [JP] Japan ................................ 2-230971

[51] Int. Cl.$^5$ .................... F16H 59/60; F16H 59/18
[52] U.S. Cl. ............................ 74/844; 74/866; 74/335
[58] Field of Search ................ 74/844, 866, 335; 192/73

[56] References Cited

U.S. PATENT DOCUMENTS

| 4,766,774 | 8/1988 | Tamai | 74/335 X |
| 4,784,007 | 11/1988 | Ishida et al. | 74/335 |
| 4,856,360 | 8/1989 | Yoshimura et al. | 74/335 |
| 4,899,607 | 2/1990 | Stainton | 74/335 |
| 4,938,088 | 7/1990 | Langley et al. | 74/335 |
| 5,044,216 | 9/1991 | Steeby et al. | 74/335 |

Primary Examiner—Dirk Wright
Attorney, Agent, or Firm—John E. Toupal; Harold G. Jarcho

[57] ABSTRACT

An arrangement wherein a proportional electromagnetic type pressure control valve is connected between a fluid pressure source and a shift actuator for changing speed stages of a vehicle transmission. The energizing current to the electromagnetic control valve is controlled by an output of an electronic-control device to provide a different shifting force for each transmission shifting operation.

20 Claims, 3 Drawing Sheets

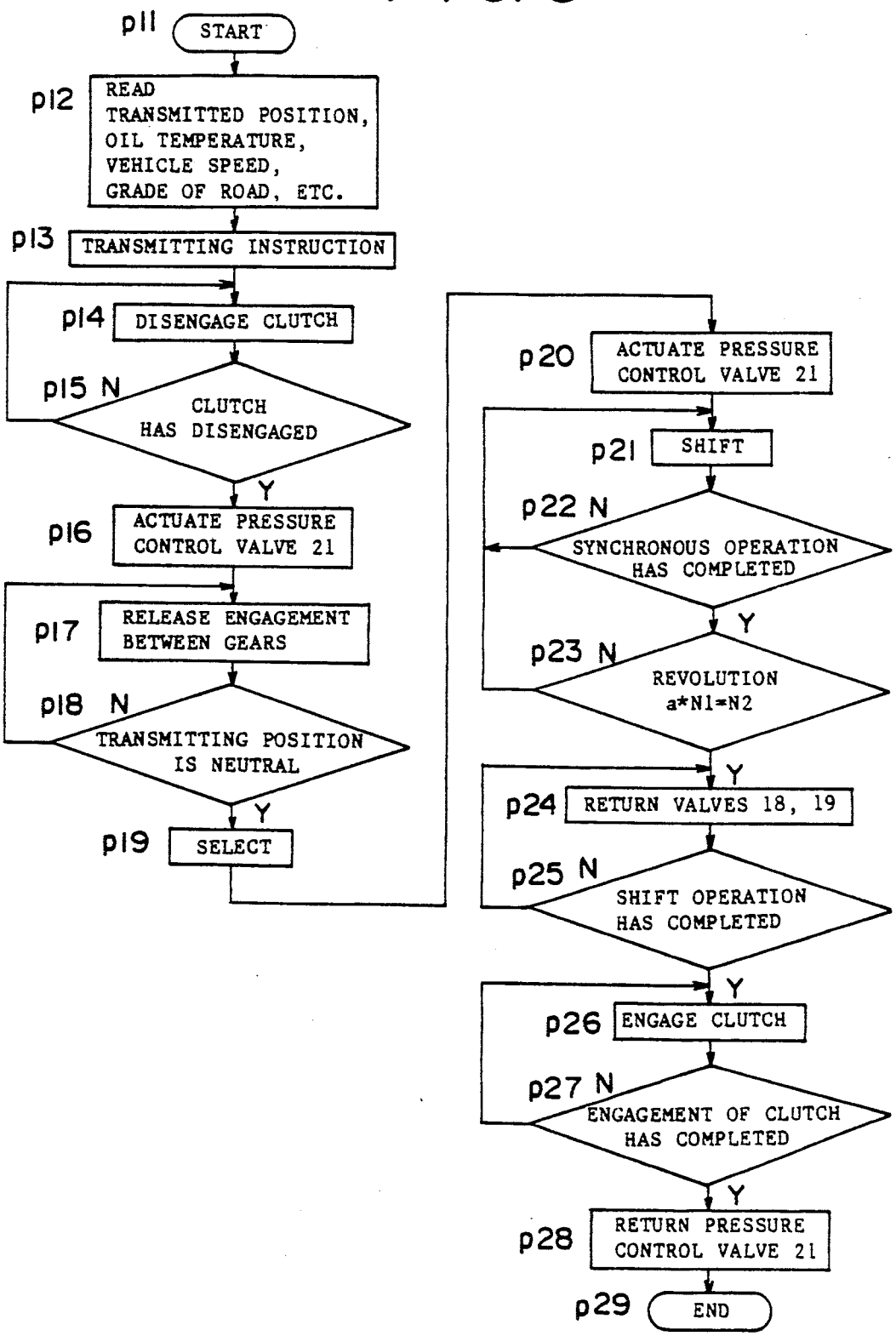

5,138,905

ELECTRONIC-CONTROLLED TRANSMISSION

BACKGROUND OF THE INVENTION

The present invention relates generally to an electronic-controlled transmission and, more particularly, to a transmission in which the force applied to a shift rod is varied to obtain smooth and rapid shifting operation.

When operating a manually-operated gear transmission, a skilled driver applies a relatively large force to a shift lever during changes in low-speed stages and applies a smaller force during changes in high-speed stages. Therefore, no excessive load is exerted on the high speed transmission mechanism which is relatively weak structurally. However, automatic control of such a transmission is sometimes preferred.

A present electronic-controlled automatic transmission utilizes a hydraulic pressure circuit to control a clutch actuator for engaging and disengaging a clutch, and a shift actuator connected to a manually-operated gear transmission. The pressure circuit is controlled by the output of an electronic control device in response to signals dependent on the position of an accelerator pedal, the rotational speed of the engine, vehicle speed, etc. However, in the case where the transmission operating mechanism is uniformly driven by a common fluid pressure actuator, a relatively small applied force increases the time required for shifting operation in low-speed stages thereby impairing smooth acceleration of the vehicle. Conversely, a relatively large applied shifting force can possibly damage the transmission mechanism when shifting in high-speed stages.

For solving the aforementioned problems, Japanese Patent Application Laid-Open No. 63 (1988) - 167,156 discloses an electronic-controlled automatic transmission in which an electromagnetic valve inserted into a drain passage of a hydraulic actuator is closed to reduce applied shifting force and thereby prevent damage of a synchronous mechanism, and subsequently the electromagnetic valve is opened to increase applied force to attain rapid shifting operation. In the aforementioned electronic-controlled automatic transmission, however, the force applied by the hydraulic actuator is not independently controlled for shifting operation at each transmission stage. Consequently, smoothness of operation is impaired.

The object of the present invention, therefore, is to provide an electronic-controlled transmission which induces rapid shifting operation at all speed ranges while avoiding damage to the transmission operating mechanism.

SUMMARY OF THE INVENTION

The present invention provides an arrangement wherein a proportional electromagnetic type pressure control valve is connected between a fluid pressure source and a shift actuator for changing speed stages of a vehicle transmission. The energizing current to the electromagnetic control valve is controlled by an output of an electronic-control device to provide a different shifting force for each transmission shifting operation. Therefore, the load applied to the transmission operating mechanism is not excessive and rapid shifting operation is obtained.

DESCRIPTION OF THE DRAWINGS

These and other objects and features of the invention will become more apparent upon a perusal of the following description taken in conjunction with the accompanying drawings wherein:

FIG. 8 is a flow chart showing programs by which the valve is controlled by an electronic-control device.

DESCRIPTION OF THE PREFERRED EMBODIMENT

Figure 1:
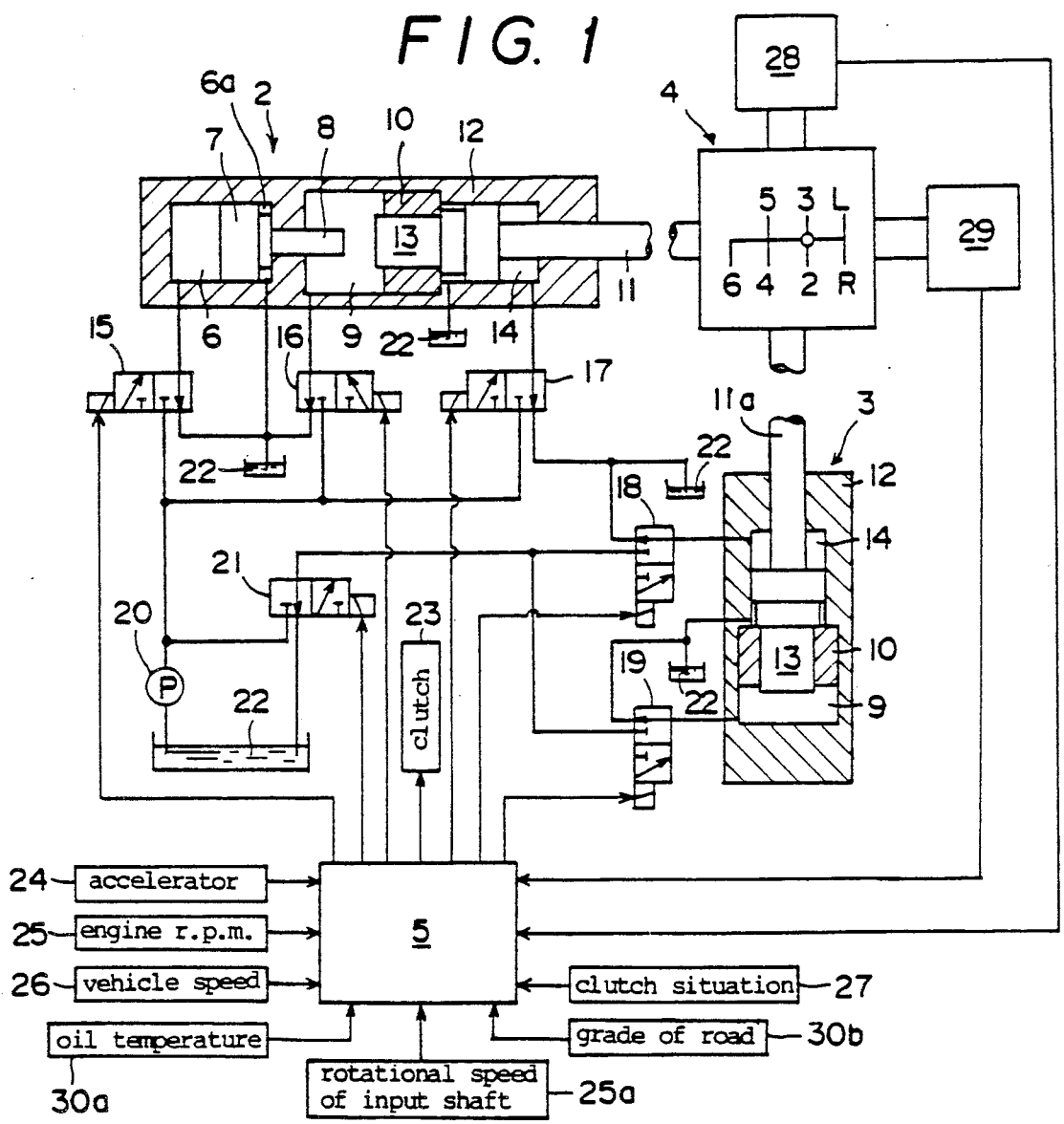
FIG. 1 is a structural view of an electronic-controlled transmission according to the present invention.

FIG. 1 illustrates an electronic-controlled automatic transmission according to the present invention. A 6-stage transmission is driven by a select actuator 2 and a shift actuator 3. The actuator 2 comprises a hollow piston 10 fitted into a large diameter portion of a stepped cylinder 12. Fitted into the hollow piston 10 is a stepped piston 13 having a small diameter portion and a large diameter portion fitted into a small diameter portion of the stepped cylinder 12. A rod 11 is connected between the stepped piston 13 and a transmission operating mechanism 4.

When pressurized oil is supplied to chambers 9 and 14 of the actuator 2, the rod 11 moves the transmission operating mechanism to a 2-3 stage as shown. When pressurized oil is supplied only to the chamber 9, the stepped piston 13 moves rightwardly and the rod 11 actuates the mechanism 4 to a L-R stage. Within the cylinder 12, a chamber 6 is separated from a chamber 6a by a piston 7 coupled to a rod 8 that extends into the chamber 9. The supply of pressurized oil only to the chamber 14 moves the stepped piston 13 leftwardly until it impinges upon a rod 8 and the rod 11 actuates the mechanism 4 to a 4-5 stage. When oil pressure in the chamber 6 is released and pressurized oil is supplied to the chamber 14, the rod 8 is pushed leftwardly by the stepped piston 13, and the rod 11 moves the transmission operating mechanism 4 to a stage-6. The chambers 6, 9 and 14 are placed in communication with either a discharge port of a hydraulic pump 20 or an oil tank 22 by electromagnetic switching valves 15, 16 and 17, respectively.

The actuator 3 is similar to a right half of the actuator 2, and common members are indicated by common reference numerals, a description of which is omitted. A rod 11a is connected between a stepped piston 13 and the transmission operating mechanism 4. Chambers 14 and 9 can be placed in communication with either the discharge port of the hydraulic pump 20 or the oil tank 22, via a pressure control valve 21 described hereinafter. Electromagnetic switching valves 18 and 19, respectively, control oil flow to the actuator 3.

An electronic-control device 5 comprised of a microcomputer selects for the actuator 3 sequential position modes that establish for the mechanism 4 operating stages corresponding to sequential ranges of vehicle operating speed. Received by the control device 5 are signals from an accelerator sensor 24 for detecting the operating position of an accelerator pedal (not shown), an r.p.m. sensor 25 for detecting the rotational speed of the vehicle's engine, and a vehicle speed sensor 26. The control device 5 selectively activates an electromagnetic switching valve (not shown) of a fluid pressure circuit for engaging and disengaging a clutch 23, the electromagnetic switching valves 15 to 19, and the proportional electromagnetic type pressure control valve 21. Operation of the clutch 23, the operating position of the actuator 2, and the operating position of the actuator 3, are detected, respectively, by a clutch sensor 27, a select sensor 29, and a shift sensor 28 that provides inputs to the control device 5 Also received by the control device 5 is a signal from a rotational speed sensor coupled to an input shaft of the vehicle's transmission (not shown). A temperature sensor 30a detects the temperature of oil supplied to the actuator 3 and provides another input to the control device 5 which also receives an input from a road sensor 30b that detects the inclination between front and rear portions of the vehicle's body.

Figure 2:
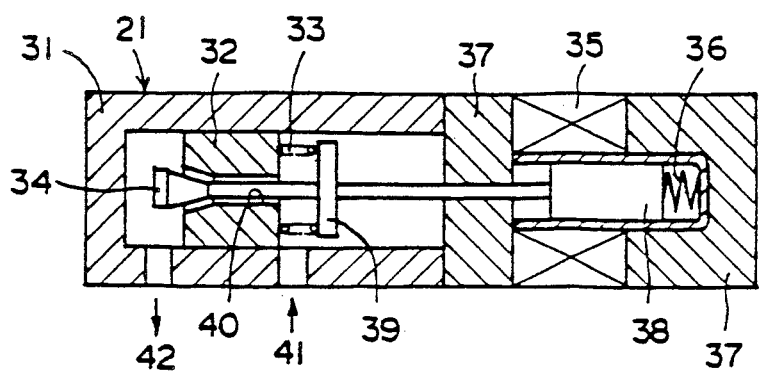
FIG. 2 is a side sectional view of a proportional electromagnetic type pressure control valve.
Figure 3:
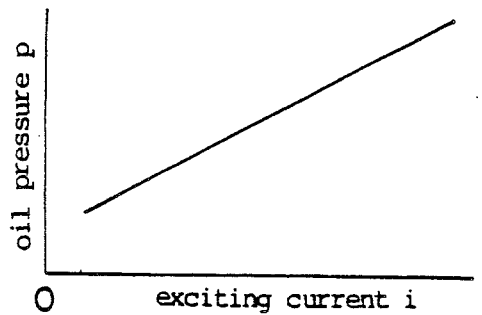
FIG. 3 is a curve depicting operational characteristics of the pressure control valve shown in FIG. 2.

As shown in FIG. 2, the proportional electromagnetic type pressure control valve 21 includes a valve seat 32 which has a tapered valve passage 40 and is fitted and supported internally of a valve housing 31. A spring 33 is interposed between a spring seat 39 on a stem of a tapered valve body 34 and the valve seat 32. The valve body 34 is movable toward and away from the valve seat 32 and is connected to a plunger 38 of an electromagnetic actuator comprising an electromagnetic coil 35, yokes 37 and the plunger 38. When the plunger 38 is attracted leftwardly in proportion to an exciting current i applied to the electromagnetic coil 35 and against the force of the spring 33, the valve body 34 is moved away from the valve passage 40. Consequently, the pressure of oil supplied from an inlet 41 to the actuator 3 via the valve passage 40 and an outlet 42 increases (see FIG. 3) which in turn increases the force applied to the mechanism by the actuator rod 11a.

Figure 4:
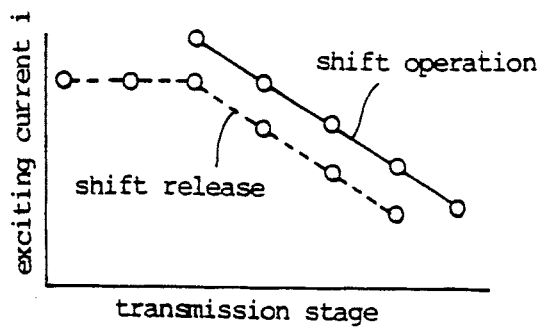
FIGS. 4 to 7 are diagrams indicative of corrections made in the current applied to the control valve.

In the present invention, a different actuating force is applied to the transmission operating mechanism 4 for inducing changes between each operating stage of the transmission. As shown in FIG. 4 exciting current supplied to the valve 21 is proportional to the torque transmitted by the transmission's operating stages and inversely proportional to an operating speed range corresponding to those stages. The electromagnetic pressure control valve 21 is regulated by the control device 5 according to the shift operation and shift release of each transmission stage thereby controlling oil pressure (see FIG. 3) supplied to the actuator 3 and actuating force provided by the actuator 3. Transmission operating stage is detected by the select sensor 29 and the shift sensor 28.

Figure 5:
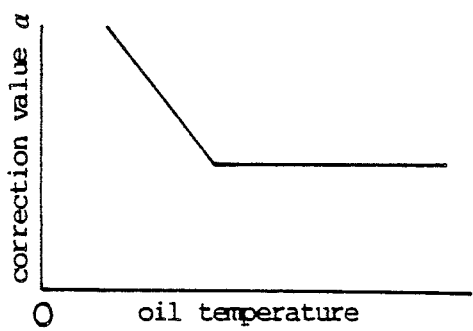
Figure 6:
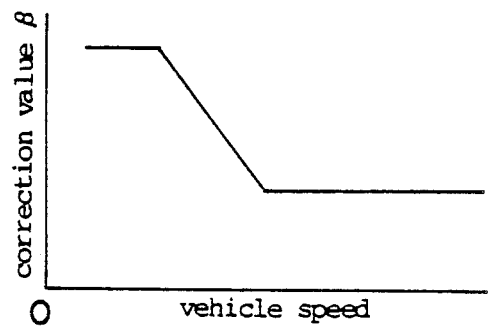
Figure 7:
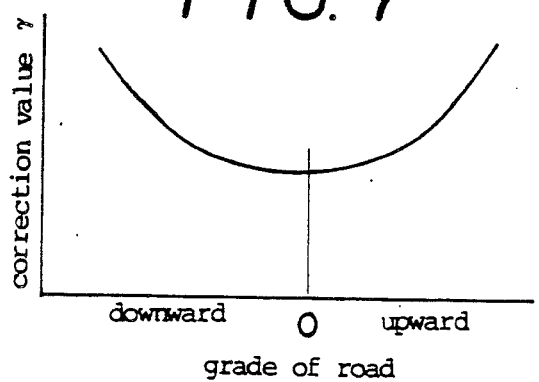

Preferably, the drive force applied by the actuator 3 is corrected according to running conditions of the vehicle. For example, when the temperature of working oil is low, an operating resistance of the actuator 3 is high and the exciting current i is multiplied by a correction value a corresponding to oil temperature, as shown in FIG. 5. In order to obtain a smooth and rapid acceleration of vehicle, the exciting current i also is multiplied by a correction value B corresponding to vehicle speed. Thus, during low speed operation, oil at a pressure higher than ordinary oil pressure is supplied to the actuator 3. Further, as shown in FIG. 7, the exciting current i is multiplied by a correction value y according to road grade. The larger the road grade, the higher the pressure of oil that is supplied to the actuator 3.

FIG. 8 is a flow chart of programs in which the aforementioned controls are carried out by the electronic-control device 5. In FIG. 8, p11 to p29 represent the steps for the programs which are repeatedly executed for each shifting operation.

At step p11, the program starts and at step p12, the transmission operating stage is read from the select sensor 29 and the shift sensor 28; and oil temperature, vehicle speed and road grade are read from the oil temperature sensor 30a, the vehicle speed sensor 26 and the road sensor 30b, respectively. At step p13, when shifting is required in view of the relationship between engine r.p.m. with respect to the present operating stage and the operating position of the accelerator pedal, the optimum transmission stage is provided by a control map stored and set in advance in ROM, and a shifting instruction is provided. At step p14, the clutch is disengaged and at step p15, judgement is made from the signal of the clutch sensor 27 as to whether the clutch is disengaged. If the clutch is not disengaged, the execution returns to p14.

If the clutch is disengaged at step p15, step p16 is executed so that the electromagnetic pressure control valve 21 is actuated corresponding to the content of shifting instruction at step p13. More specifically, an exciting current i corresponding to the present shift position, oil temperature, vehicle speed and road grade is obtained from the control map stored and set in advance in ROM and is applied to the electromagnetic pressure control valve 21 to thereby control the oil pressure supplied to the actuator 3 via the electromagnetic switching valves 18 and 19. At step p17, one of the electromagnetic switching valves 18 and 19 is excited and switched to drive the actuator 3 and release engagement between gears at the present gear position. Judgement is made at step p18 whether the transmission is at a neutral position. If the transmission is not in the neutral position, the execution returns to step p17.

Providing that the transmission is in the neutral position at step p18, a selection is made at step p19. More specifically, two or three of the electromagnetic switching valves 15, 16 and 17 are excited and switched to drive the actuator 2. At step p20, an exciting current i corresponding to a new gear position, oil temperature, vehicle speed and road grade is obtained from ROM and is applied to the electromagnetic pressure control valve 21 to control oil pressure supplied to the actuator 3 via the electromagnetic switching valves 18 and 19. At step p21, one of the electromagnetic switching valves 18 and 19 is excited and switched to drive the actuator 3. Judgement is made at step 22 as to whether a predetermined transmission gear determined at step p13 has been obtained. That is, since the number of revolutions of the input shaft of the transmission varies before and after the synchronous operation, the synchronous operation is judged to have been completed when a variation in signal of the rotational speed sensor 25a provided at the input shaft does not exist (dN/Dt=0). If the synchronous operation of the synchronous mechanism of the transmission gear is not completed at step p22, the execution returns to step p21.

Provided that the selection of the predetermined transmission gear is completed at step p22, a judgement is made at step p23 as to whether vehicle speed has assumed a value corresponding to the operating condition of the engine and the selected gear. More specifically, judgement is made as to whether a value obtained by multiplying the number of revolutions N1 of the input shaft of the transmission by a ratio a of transmission gears is equal to the number of revolutions N2 of the output shaft of the transmission. If the value obtained is not equal to the number of revolutions N2 of the output shaft, the execution returns to step p21.

Provided that the value obtained by multiplying the number of revolutions N1 of the input shaft of the transmission by the ratio a of transmission gears is equal to the number of revolutions N2 of the output shaft at step p23, the electromagnetic switching valves 18 and 19 are returned to the illustrated positions at step p24. At step p25, judgement is made as to whether a shift to a predetermined gear position has been made as indicated by signals of the select sensor 29 and the shift sensor 28. If the shift to a predetermined gear has not been made, the execution is returned to step p24.

Provided that a shift to a predetermined gear position has been made at step p25, the clutch is engaged at step p26. At step p27, judgement is made as to whether the clutch is engaged as indicated by a signal of the clutch sensor 27. If the clutch is not engaged, the execution returns to step p26. However, if the clutch is engaged, the electromagnetic pressure control valve 21 is returned to the illustrated open position at step p28, and the program is terminated at step p29.

Obviously, many modifications and variations of the present invention are possible in light of the above teachings. For example, while in the aforementioned embodiments, an electronic-controlled automatic transmission has been described, it is to be noted that the present invention is not limited thereto but can be applied also to a remote-controlled transmission in which the engine and the transmission are mounted at the rear of a vehicle body, as in a large-sized bus, and a transmission lever at a driver's seat is not mechanically connected to the transmission. In that case, a transmitting position signal selected by operating a transmissions lever by a driver would be fed to an electronic-control device, and the clutch would be engaged and disengaged by a clutch pedal operated by a driver. It is to be understood, therefore, that the invention can be practiced otherwise than as specifically described.

What is claimed is:

1. A vehicle transmission control system comprising:
   actuator means adapted for coupling to a transmission providing a plurality of stages corresponding to sequential ranges of operating speed, said actuator means producing a variable output force in a plurality of modes each inducing a different one of said stages;
   adjustment means for selectively varying the output force produced by said actuator means; and
   control means operatively coupled to said adjustment means and said actuator means and adapted to selectively and sequentially produce said plurality of modes and adapted to cause said adjustment means to provide a predetermined different said output force in each of said modes.

2. A system according to claim 1 wherein said actuator means comprises a hydraulically driven piston means, and said adjustment means is adapted to vary the hydraulic pressure applied to said piston means.

3. A system according to claim 2 wherein said adjustment means comprises an electromagnetically operated proportional valve for supplying a selectively variable hydraulic fluid pressure to said piston means.

4. A system according to claim 3 wherein said piston means comprises a first piston for coupling to the transmission and movable into a plurality of positions each corresponding to a different pair of said operating speed stages, and a second piston for coupling to the transmission and movable into alternate positions each of which induce for each said pair a different one of said operating speed stages; and said adjustment means varies the output force produced by said second piston.

5. A system according to claim 4 wherein said control means comprises computer means for controlling the energizing current supplied to said valve.

6. A system according to claim 5 wherein said system further comprises temperature sensing means for sensing the temperature of the hydraulic fluid supplied by said valve, and said computer means varies said energizing current in response to said temperature sensing means.

7. A system according to claim 5 wherein said system further comprises a vehicle speed sensing means, and said computer means varies said energizing current in response thereto.

8. A system according to claim 5 wherein said system further comprises a road grade sensing means, and said computer means varies said energizing current in response thereto.

9. A system according to claim 1 wherein said system further comprises means for sensing accelerator position, engine r.p.m., and vehicle speed; and said control means produces said modes in response thereto.

10. A system according to claim 1 wherein said system further comprises clutch actuation means, and said control means is adapted to deactivate said actuation means when changing between said modes.

11. A system according to claim 1 wherein said control means is adapted to cause said adjustment means to vary said output force inversely proportionally to the operating speed range corresponding to each said stage induced.

12. A system according to claim 11 wherein said actuator means comprises a hydraulically driven piston means, and said adjustment means is adapted to vary the hydraulic pressure applied to said piston means.

13. A system according to claim 12 wherein said adjustment means comprises an electromagnetically operated proportional valve for supplying a selectively variable hydraulic fluid pressure to said piston means.

14. A system according to claim 13 wherein said piston means comprises a first piston for coupling to the transmission and movable into a plurality of positions each corresponding to a different pair of said operating speed stages, and a second piston for coupling to the transmission and movable into alternate positions each of which induce for each said pair a different one of said operating speed stages; and said adjustment means varies the output force produced by said second piston.

15. A system according to claim 14 wherein said control means comprises computer means for controlling the energizing current supplied to said valve.

16. A system according to claim 15 wherein said system further comprises temperature sensing means for sensing the temperature of the hydraulic fluid supplied by said valve, and said computer means varies said energizing current in response to said temperature sensing means.

17. A system according to claim 15 wherein said system further comprises a vehicle speed sensing means, and said computer means varies said energizing current in response thereto.

18. A system according to claim 15 wherein said system further comprises a road grade sensing means, and said computer means varies said energizing current in response thereto.

19. A system according to claim 11 wherein said system further comprises means for sensing accelerator position, engine r.p.m., and vehicle speed; and said control means produces said modes in response thereto.

20. A system according to claim 11 wherein said system further comprises clutch actuation means, and said control means is adapted to deactivate said actuation means when changing between said modes.

* * * * *